UNITED STATES PATENT OFFICE.

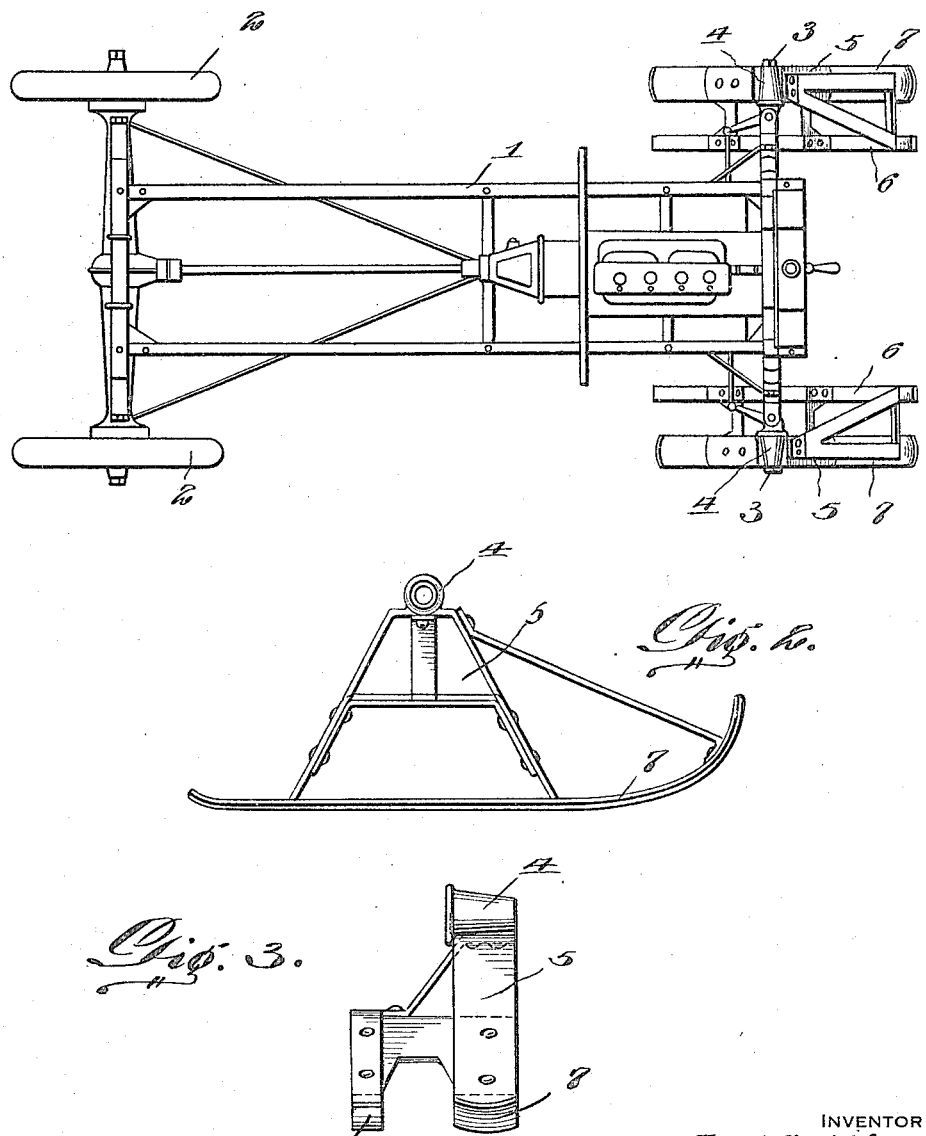

LUCIUS J. COLLINS, OF MINNEAPOLIS, MINNESOTA.

AUTOMOBILE SLED-RUNNER.

1,229,889.

Specification of Letters Patent. Patented June 12, 1917.

Application filed December 29, 1916. Serial No. 139,664.

*To all whom it may concern:*

Be it known that I, LUCIUS J. COLLINS, a citizen of the United States, residing at Minneapolis, in the county of Hennepin and State of Minnesota, have invented new and useful Improvements in Automobile Sled-Runners, of which the following is a specification.

This invention relates to sled runners especially adapted to be applied to the steering spindles of an automobile and it consists in the novel features hereinafter described and claimed.

An object of the invention is to provide a runner of the character stated which when applied will make a track in the snow upon which the power driven wheel of the automobile machine may travel and also to provide an additional runner adapted to travel upon the beaten track of an ordinary sleigh.

That is to say when the runners are mounted upon the steering spindles at the front axle of an automobile the outer runner members travel in pairs beyond the tracks of an ordinary sleigh and they form paths upon which the power driven wheels may travel while the inner runner members travel along the beaten track made by the sleigh and hence the forward portion of the automobile is supported upon a comparatively smooth surface while paths are formed for the rear wheels which will enable them to have sufficient frictional contact with the snow to properly propel the vehicle.

With this object in view each runner comprises a comparatively broader outer member and a relatively narrow inner runner member. When the runner is applied to the steering spindle of an automobile the narrow runner member is located within the line of travel of the power driven wheel of the machine while the outer broad runner member is located in the path of travel of the power driven wheel of the machine.

In the accompanying drawing:—

Figure 1 is a diagrammatic plan view of the running gear of an automobile showing the runners applied thereto;

The other figures are detailed views of the features of the invention.

As illustrated in the accompanying drawing, the running gear 1 of the automobile is supported at its rear upon the power driven wheel 2 in a usual manner. The runners applied to the steering spindle of the running gear which are indicated at 3.

Each runner comprises a sleeve 4 which is adapted to receive one of the steering spindles and a frame 5 is attached to the said sleeve. A relatively narrow runner member 6 is attached to the inner portion of the frame 5 and is provided with a flat undersurface. A relatively broad runner member 7 is attached to the outer portion of the frame 5 and lies parallel with the runner member 6. The runner members 6 and 7 are spaced from each other and the under surface of the runner member 7 is convexed. Both of the runner members 6 and 7 extend upwardly at their forward ends and may be connected together by suitable braces.

When the runner is applied to the steering spindle of an automobile the runner member 7 is in alinement with the rear driving wheel of the machine and the runner member 6 is in a line within the path of travel of the driving wheel of the automobile. The runner member 6 is adapted to travel in the rut or track which is made by a sleigh upon a roadway while the runner member 7 travels in a line beyond the said rut or track and forms a path by compressing the snow and upon which the rear driving wheel of the automobile may travel. Therefore as the automobile travels along a roadway, the inner runner members 6 move along beaten tracks of paths and support the major portion of the weight of the forward part of the machine. Thus the machine is not subjected to excessive jolting or jarring. At the same time the runner members 7 travel over the unbeaten snow and form tracks or paths in the same by compressing it and the rear driving wheels of the machine move over the said beaten paths or tracks and hence they may have sufficient frictional contact with the said tracks or paths to properly propel the machine.

The steering spindles are adapted to be swung in the usual manner by operating the steering wheel of the machine and hence the runners may be turned to properly guide the automobile. In view of the fact that the sleeves 4 are loosely mounted upon the spindles 3 the runners may swing vertically as they pass over uneven portions of the road and thus the automobile is moved smoothly over the snow.

From the foregoing description taken in conjunction with the accompanying drawing, it will be seen that an automobile runner of simple and durable structure is provided and that when the same is applied to the steering spindle of an automobile the major portion of the forward part of the machine is supported upon a track of the roadway while an additional relatively broad runner member is provided for forming a track in the snow upon which the power driven wheel of the automobile may travel.

Having described the invention what is claimed is:—

1. In combination with a vehicle having power driven wheels and steering spindles, runners mounted upon the spindles, the said runners including inner runner members adapted to travel in lines within the paths of movement of the power driven wheel, the said runners also including outer runner members which move in the paths of movement of the power driven wheel of the vehicle.

2. In combination with a vehicle having power driven wheels and a steering spindle, runners mounted upon the spindle, the said runners including inner relatively narrow runner members adapted to travel in lines within the paths of movement of the power driven wheel, the said runner also including relatively broad outer runner members adapted to travel in the paths of movement of the power driven wheels of the vehicle.

3. In combination with a vehicle having power driven wheels and a steering spindle, runners mounted upon the spindles and including relatively narrow inner runner members adapted to travel in lines within the paths of movement of the power driven wheels of the vehicle, said runner also including relatively broad transversely convexed runner members which move in the paths of movement of the power driven wheels of the vehicle.

4. A runner adapted to be applied to the spindle of a power driven vehicle comprising a sleeve, a frame attached to the sleeve, a relatively broad runner member attached to the outer portion of the frame, a relatively narrow runner member attached to the inner portion of the frame, said runner members being parallel with each other and spaced from each other.

In testimony whereof I affix my signature.

LUCIUS J. COLLINS.

Copies of this patent may be obtained for five cents each, by addressing the "Commissioner of Patents, Washington, D. C."